United States Patent
Yang et al.

(10) Patent No.: US 10,239,167 B2
(45) Date of Patent: Mar. 26, 2019

(54) STIFFNESS-FREQUENCY ADJUSTABLE XY MICROMOTION STAGE BASED ON STRESS STIFFENING

(71) Applicant: Guangdong University of Technology, Guangzhou (CN)

(72) Inventors: Zhijun Yang, Guangzhou (CN); Youdun Bai, Guangzhou (CN); Xin Chen, Guangzhou (CN); Jian Gao, Guangzhou (CN); Haidong Yang, Guangzhou (CN); Meng Wang, Guangzhou (CN); Hui Tang, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 15/114,090

(22) PCT Filed: Sep. 24, 2014

(86) PCT No.: PCT/CN2014/087285
§ 371 (c)(1),
(2) Date: Jul. 26, 2016

(87) PCT Pub. No.: WO2017/176444
PCT Pub. Date: Nov. 26, 2015

(65) Prior Publication Data
US 2017/0001275 A1    Jan. 5, 2017

(30) Foreign Application Priority Data

May 20, 2014    (CN) .......................... 2014 1 0214646

(51) Int. Cl.
*B23Q 1/34*    (2006.01)
*B23Q 1/62*    (2006.01)
*B23Q 5/28*    (2006.01)

(52) U.S. Cl.
CPC .................. *B23Q 1/34* (2013.01); *B23Q 1/62* (2013.01); *B23Q 5/28* (2013.01); *B23Q 2210/002* (2013.01); *B23Q 2230/004* (2013.01)

(58) Field of Classification Search
CPC ... B23Q 1/25; B23Q 1/26; B23Q 1/34; B23Q 5/34
See application file for complete search history.

(56) References Cited

U.S. PATENT DOCUMENTS 3,786,332 A * 1/1974 Hepner .............. G01B 9/02019
                                                                318/577
4,667,415 A * 5/1987 Barsky ..................... B23Q 1/36
                                                                 269/73

(Continued)

FOREIGN PATENT DOCUMENTS

CN    101837586 A    9/2010
CN    102490021 A    6/2012

(Continued)

OTHER PUBLICATIONS

International Search Report based on Application No. PCT/CN2014/087285 (2 Pages and 2 Pages of English translation) dated Feb. 9, 2015 (Reference Purpose Only).

*Primary Examiner* — Tyrone V Hall, Jr.
(74) *Attorney, Agent, or Firm* — W&K IP (Wayne & King)

(57) ABSTRACT

The present disclosure involves occasions where precise two-dimensional motion takes place, and is applicable to XY motion stages for precise displacement compensation. The present disclosure particularly involves a stiffness-frequency adjustable XY micromotion stage based on stress stiffening, which includes X-direction and Y-direction motion sub-stages and corresponding drivers and a micromotion working table. The micromotion stage uses membrane sets that have tension levels thereof adjusted by bolts (Continued)

as a flexible hinge, so as to achieve independent adjustment of the vibration frequency of the XY micromotion stage. The present disclosure implements the foregoing configuration based on prestressed membrane, so the frequency is adjustable. The inherent frequency of the micromotion stage can be adjusted before or during operation according to various working conditions and driving frequency. The two feed motion direction are perpendicular so as to prevent the micromotion working table from coupling during two-dimensional motion.

11 Claims, 5 Drawing Sheets

(56) References Cited

U.S. PATENT DOCUMENTS

| | | | | |
|---|---|---|---|---|
| 4,691,586 | A * | 9/1987 | van Leijenhorst | B23Q 1/36 248/251 |
| 5,073,912 | A * | 12/1991 | Kobayashi | B23Q 1/34 250/491.1 |
| 5,101,301 | A * | 3/1992 | Iwase | G02B 7/1825 108/143 |
| 5,165,205 | A * | 11/1992 | Nakagawa | B23Q 1/34 366/108 |
| 5,297,130 | A * | 3/1994 | Tagawa | G01Q 10/04 250/307 |
| 5,438,451 | A * | 8/1995 | Schweizer | B23Q 1/34 359/224.1 |
| 5,623,853 | A * | 4/1997 | Novak | G03F 7/70358 355/53 |
| 5,705,878 | A * | 1/1998 | Lewis | H02N 2/028 310/328 |
| 5,718,160 | A * | 2/1998 | Ohsumi | B23Q 1/38 92/117 A |
| 6,484,602 | B1 * | 11/2002 | Dagalakis | B23Q 1/34 74/490.01 |
| 6,860,020 | B2 * | 3/2005 | Pahk | B23Q 1/34 248/913 |
| 7,637,487 | B2 * | 12/2009 | Muto | B23Q 1/621 269/289 R |
| 2014/0035959 | A1 | 2/2014 | Lapstun | |

FOREIGN PATENT DOCUMENTS

| | | | |
|---|---|---|---|
| CN | 202861789 U | * | 4/2013 |
| CN | 202861789 U | | 4/2013 |
| CN | 103170845 A | | 6/2013 |
| CN | 203804647 U | | 9/2014 |

* cited by examiner

STIFFNESS-FREQUENCY ADJUSTABLE XY MICROMOTION STAGE BASED ON STRESS STIFFENING

RELATED APPLICATIONS

The present application is a national stage entry according to 35 U.S.C. § 371 of PCT application No.: PCT/CN2014/087285 filed on Sep. 24, 2014, which claims priority from China Patent application No.: 201410214646.X filed on May 20, 2014, and is incorporated herein by reference in its entirety.

TECHNICAL FIELD

The present disclosure relates to precise motion stages for precise operation and macro-micro composite high-speed precise compensation. More particularly, the present disclosure relates to a stiffness-frequency adjustable XY micromotion stage based on stress stiffening.

BACKGROUND

For achieving precise two-dimensional motion, an accurate, stable feed mechanism is important because it is highly related to the quality of products. In addition, complex optical freeform surfaces feature for small volume and high precision, and thus demand more form micro-feed mechanisms. A micro-feed system is the basis for processing this type of products, and is extensively used in fast tool servo systems, micromotion tables and macro-micro composite stages. A traditional two-dimensional micro-feed device is typically designed to work with a fixed frequency, and therefore is highly demanding in terms of material properties and manufacturing errors. Particularly, for processing different products, its driving frequency often changes, and this makes a motion stage with a fixed frequency have inconsistent displacement amplification factors, which leads to distortion of displacement amplification. Moreover, the motion coupling of XY micromotion stages based on the existing flexible hinges involves complicated motion control and thus hardly meets the requirements for high-speed precise motion.

SUMMARY

The present disclosure provides a stiffness-frequency adjustable XY micromotion stage based on stress stiffening. The stage incorporates prestressed membranes and allows adjustment in terms of frequency. Its two feed devices have mutually perpendicular driving directions, thereby preventing the working table from coupling during two-dimensional motion.

For achieving this objective, the present disclosure implements the following technical scheme:

a stiffness-frequency adjustable XY micromotion stage based on stress stiffening, including an X-direction membrane set (201), a Y-direction membrane set (202), an X-direction motion sub-stage (203), a Y-direction motion sub-stage (204), an outer frame (205), an X-direction drive, a Y-direction drive, an X-direction displacement sensor (8), a Y-direction displacement sensor (10), a rack (1) and a working table (5);

the outer frame (205) being fixed to the rack (1); the elastic X-direction membrane set (201) being arranged at two sides of the X-direction motion sub-stage (203), with one end thereof connected to an inner wall of the outer frame (205) and an opposite end thereof connected to the X-direction motion sub-stage (203); the elastic Y-direction membrane set (202) being arranged at two sides of the Y-direction motion sub-stage (204), with one end thereof connected to an inner wall of the X-direction motion sub-stage (203), and an opposite end thereof connected to the Y-direction motion sub-stage (204); the X-direction membrane set (201) and the Y-direction membrane set (202) being perpendicular to each other, and the working table (5) being rigidly connected to the Y-direction motion sub-stage (204);

membranes in each of the X-direction membrane set (201) and the Y-direction membrane set (202) being parallelly arranged, and having longitudinal directions perpendicular to feed directions of the X-direction motion sub-stage (203) and of the Y-direction motion sub-stage (204), respectively;

the X-direction drive including an X-direction drive stator (301) and an X-direction drive mover (302); the Y-direction drive including a Y-direction drive stator (401) and a Y-direction drive mover (402), the X-direction drive stator (301) and the Y-direction drive stator (401) being both fixed to the rack (1); the X-direction drive mover (302) being fixed to the X-direction motion sub-stage (203), and the Y-direction drive mover (402) being fixed to the Y-direction motion sub-stage (204);

the outer frame (205) having a groove (2) formed at where it adjoins the X-direction membrane set (201) so that an inner side of the outer frame (205) forms a thin and deformable X-direction motion sub-stage spring member (6), wherein the outer frame (205) has an X-direction frequency adjusting mechanism (11) for adjusting deformation of the X-direction motion sub-stage spring member (6); and the Y-direction motion sub-stage (204) having a deformable Y-direction motion sub-stage spring member (9) at where it adjoins the Y-direction membrane set (202), wherein the Y-direction motion sub-stage (204) has a Y-direction frequency adjusting mechanism (7) for adjusting the Y-direction motion sub-stage spring member (9).

An X-direction displacement sensor (8) and Y-direction displacement sensor (10) are provided at ends of the feed directions of the X-direction motion sub-stage (203) and of the Y-direction motion sub-stage (204), respectively.

The X-direction displacement sensor (8) and the Y-direction displacement sensor (10) are capacitive or inductive sensors.

Insulating layers are provided at non-working surfaces of the X-direction displacement sensor (8) and of the Y-direction displacement sensor (10).

The X-direction membrane set (201), the Y-direction membrane set (202), the X-direction motion sub-stage (203), the Y-direction motion sub-stage (204) and the outer frame (205) are integratedly formed.

The Y-direction motion sub-stage (204) has round recesses (206) formed at inner corners thereof.

The X-direction voice coil motor has a magnetic stator (301) and a coil mover (302) that are separated by an interval (303) in the Y direction as shown in the drawings, and the Y-direction voice coil motor has a magnetic stator (401) and a coil mover (402) that are separated by an interval (403) in the X direction as shown in the drawings, thereby the driving mechanisms enable XY motion decoupling.

The X-direction driver (401) and the Y-direction driver (402) are voice coil motors.

The X-direction frequency adjusting mechanism (11) is a bolt that passes through the groove (2) and has two ends connected to two sides of the groove (2), respectively, and the Y-direction frequency adjusting mechanism (7) is a bolt that passes through the Y-direction motion sub-stage (204) and is connected to the working table (5).

The X-direction frequency adjusting mechanism (11) is a piezoelectric ceramic driver that passes through the groove (2) and has two ends connected to two sides of the groove (2), and the Y-direction frequency adjusting mechanism (7) is a piezoelectric ceramic driver that passes through the Y-direction motion sub-stage (204) and is connected to the working table (5).

The technical principle proposed by the present disclosure for frequency adjustment of a micromotion stage is that: the flexible mechanism constructed from prestressed membranes has an inherent frequency that relates to the tension of the prestressed membranes. The inherent frequency of the mechanism can be changed by adjusting the tension of the prestressed membranes, so as to meet the needs of various working conditions.

With the foregoing technical scheme, the frequency adjustable XY micromotion stage of the present disclosure provides the following advantages:

1. The design achieves change of the inherent frequency of the mechanism by adjusting the tension levels of the prestressed membranes, so as to enable manual or dynamic adjustment and in turn improve the performance of the micromotion stage.

2. In the disclosed XY micromotion stage, the drivers have their heavy stators fixed to the rack, so the motional inertia of the XY micromotion stage can be minimized and the response of the micromotion stage can be accelerated.

3. The disclosed XY micromotion stage uses an integratedly formed flexible mechanism to perform two-dimensional displacement in the XY plane. Since there are no sub-intervals between the X-direction motion table and the Y-direction motion table, the micromotion stage is suitable to use in working environments where high operational frequency is required.

4. In the disclosed XY micromotion stage, the X-direction motion is perpendicular to the Y-direction motion, so the motion control is simple.

Therein: rack 1, groove 2, X-direction membrane set 201, Y-direction membrane set 202, X-direction motion sub-stage 203, Y-direction motion sub-stage 204, outer frame 205, recess 206, X-direction drive stator 301, X-direction drive mover 302, Y-direction drive stator 401, Y-direction drive mover 402, working table 5, X-direction motion sub-stage spring member 6, Y-direction frequency adjusting mechanism 7, X-direction displacement sensor 8, Y-direction motion sub-stage spring member 9, Y-direction displacement sensor 10, X-direction frequency adjusting mechanism 11, Y-direction piezoelectric ceramic plate 12, X-direction piezoelectric ceramic plate 13.

DETAILED DESCRIPTION

The technical scheme of the disclosure will be best understood by reference to the following detailed description of illustrative embodiments when read in conjunction with the accompanying drawings.

Figure 1:
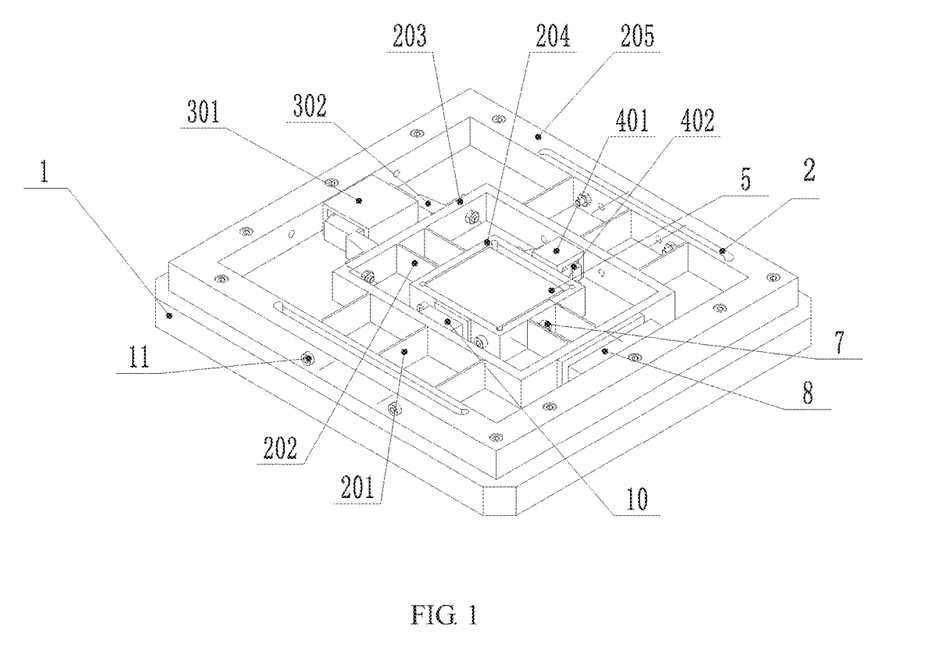
FIG. 1 is a perspective view of one embodiment of the present disclosure.
Figure 2:
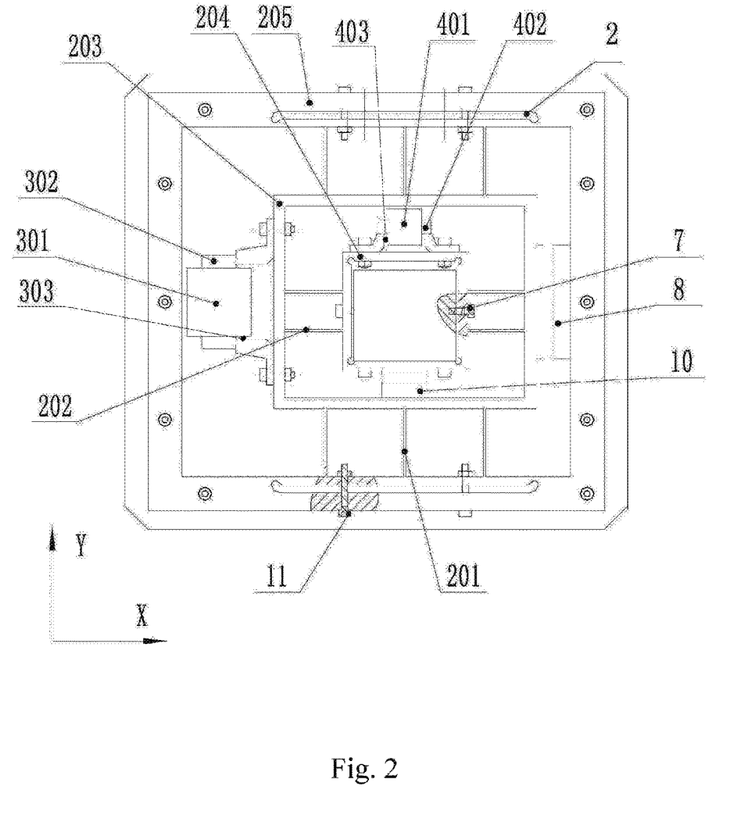
FIG. 2 is a front view of the embodiment of the present disclosure.
Figure 3:
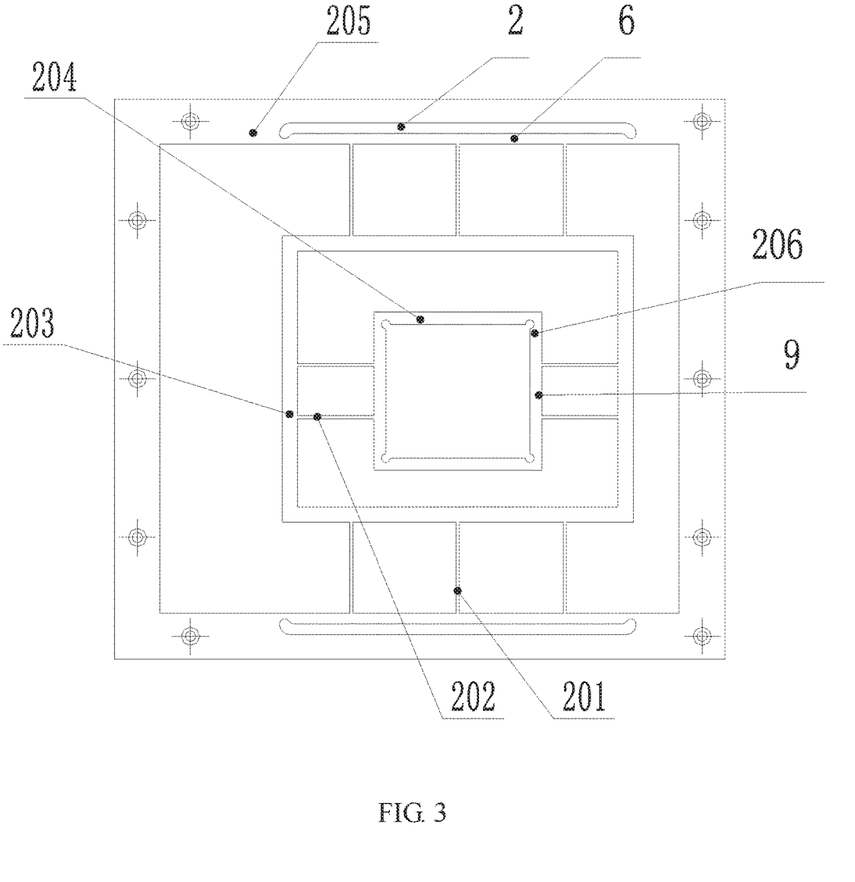
FIG. 3 schematically shows the integrated structure of a membrane set, a movement sub-stage and an outer frame of the one-dimensional micromotion stage of the present disclosure.

Referring to FIG. 1 through FIG. 3, a stiffness-frequency adjustable XY micromotion stage based on stress stiffening includes an X-direction membrane set 201, a Y-direction membrane set 202, an X-direction motion sub-stage 203, a Y-direction motion sub-stage 204, an outer frame 205, an X-direction drive, a Y-direction drive, an X-direction displacement sensor 8, a Y-direction displacement sensor 10, a rack 1 and a working table 5.

The outer frame 205 is fixed to the rack 1. The elastic X-direction membrane set 201 is arranged at two sides of the X-direction motion sub-stage 203, with one end thereof connected to an inner wall of the outer frame 205 and an opposite end thereof connected to the X-direction motion sub-stage 203. The elastic Y-direction membrane set 202 is arranged at two sides of the Y-direction motion sub-stage 204, with one end thereof connected to an inner wall of the X-direction motion sub-stage 203, and an opposite end thereof connected to the Y-direction motion sub-stage 204. The X-direction membrane set 201 and the Y-direction membrane set 202 are perpendicular to each other. The working table 5 is rigidly connected to the Y-direction motion sub-stage 204.

Membranes in each of the X-direction membrane set 201 and the Y-direction membrane set 202 are parallelly arranged, and have longitudinal directions perpendicular to feed directions of the X-direction motion sub-stage 203 and of the Y-direction motion sub-stage 204, respectively.

The X-direction drive includes an X-direction drive stator 301 and an X-direction drive mover 302. The Y-direction drive includes a Y-direction drive stator 401 and a Y-direction drive mover 402. The X-direction drive stator 301 and the Y-direction drive stator 401 are both fixed to the rack 1. The X-direction drive mover 302 is fixed to the X-direction motion sub-stage 203, and the Y-direction drive mover 402 is fixed to the Y-direction motion sub-stage 204. The X-direction drive drives the X-direction motion sub-stage 203 to move in the X direction, and the Y-direction drive drives the Y-direction motion sub-stage 204 to move in the Y direction.

As shown in FIG. 3, the outer frame 205 has a groove 2 formed at where it adjoins the X-direction membrane set 201 so that an inner side of the outer frame 205 forms a thin and deformable X-direction motion sub-stage spring member 6. The outer frame 205 has an X-direction frequency adjusting mechanism 11 for adjusting deformation of the X-direction motion sub-stage spring member 6. The Y-direction motion sub-stage 204 has a deformable Y-direction motion sub-stage spring member 9 at where it adjoins the Y-direction membrane set 202. The Y-direction motion sub-stage 204 has a Y-direction frequency adjusting mechanism 7 for adjusting the Y-direction motion sub-stage spring member 9.

The X-direction driver drives the X-direction motion sub-stage 203 as well as the Y-direction motion sub-stage 204 and the working table 5 connected thereto to perform micro-scale displacement in the X direction. With the restriction provided by the X-direction membrane set 201, the X direction motion sub-stage 203 is prevented from moving in any directions other than the X direction.

The Y-direction driver drives the Y-direction motion sub-stage 204 as well as the working table 5 connected thereto to perform micro-scale displacement in the Y direction. With the restriction provided by the Y-direction membrane set 202, the Y-direction motion sub-stage 204 is prevented from moving in any directions other than the Y direction.

The working table is equipped with a functioning element such as a tool, and driven by the X-direction driver and the Y-direction driver to perform two-dimensional displacement as required by the engineering operation.

By changing the tension level of the X-direction frequency adjusting mechanism 11 and of the Y-direction frequency adjusting mechanism 7, the inherent frequency of the foregoing mechanism and in turn the motion properties of the working table 5 can be changed.

The X-direction drive stator 301 and the Y-direction drive stator 401 are both fixed to the rack 1. They are lightweight and they vibrate with small energy and high frequency.

As shown in FIG. 1, an X-direction displacement sensor 8 and Y-direction displacement sensor 10 are provided at ends of the feed directions of the X-direction motion sub-stage 203 and of the Y-direction motion sub-stage 204, respectively, for detecting the micro-scale displacement of the working table 5 in the X and Y directions.

The X-direction displacement sensor 8 and the Y-direction displacement sensor 10 are capacitive or inductive sensors.

Insulating layers are provided at non-working surfaces of the X-direction displacement sensor 8 and of the Y-direction displacement sensor 10, for preventing the displacement sensors from interference from other metal materials, thereby ensuring the accuracy of measurement.

The X-direction membrane set 201, the Y-direction membrane set 202, the X-direction motion sub-stage 203, the Y-direction motion sub-stage 204 and the outer frame 205 are integratedly formed. Particularly, they are made from a mass of material by milling and electric spark processing. This eliminates the risk of assembling errors among components, and thus helps to improve the motional prevision of the stage.

As shown in FIG. 3, the Y-direction motion sub-stage 204 has round recesses 206 formed at inner corners thereof. The recess 206 is for ensuring that the frequency adjusting device of the present disclosure can better adjust the tension on the membranes of the X-direction membrane set 201 and of the Y-direction membrane set 202.

The X-direction voice coil motor has a magnetic stator 301 and a coil mover 302 that are separated by an interval 303 in the Y direction as shown in the drawings, and the Y-direction voice coil motor has a magnetic stator 401 and a coil mover 402 that are separated by an interval 403 in the X direction as shown in the drawings. In this way, the driving mechanisms enable XY motion decoupling.

The X-direction driver 401 and the Y-direction driver 402 are voice coil motors.

The X-direction frequency adjusting mechanism 11 is a bolt that passes through the groove 2 and has two ends connected to two sides of the groove 2, respectively, and the Y-direction frequency adjusting mechanism 7 is a bolt that passes through the Y-direction motion sub-stage 204 and is connected to the working table 5.

As shown in FIG. 1 through FIG. 3, the X-direction frequency adjusting mechanism 11 and the Y-direction frequency adjusting mechanism 7 are bolts. The bolts can be manually operated to perform displacement in their lengthwise directions, so as to change the tension levels of the X-direction motion sub-stage spring member 6 and of the Y-direction motion sub-stage spring member 9, respectively, thereby changing the tension levels of membranes in the X-direction membrane set 201 and in the Y-direction membrane set 202, and in turn achieving dynamic adjustment of the inherent frequency of the stage.

The X-direction frequency adjusting mechanism 11 is a piezoelectric ceramic driver that passes through the groove 2 and has two ends connected to two sides of the groove 2, and the Y-direction frequency adjusting mechanism 7 is a piezoelectric ceramic driver that passes through the Y-direction motion sub-stage 204 and is connected to the working table 5.

Figure 4:
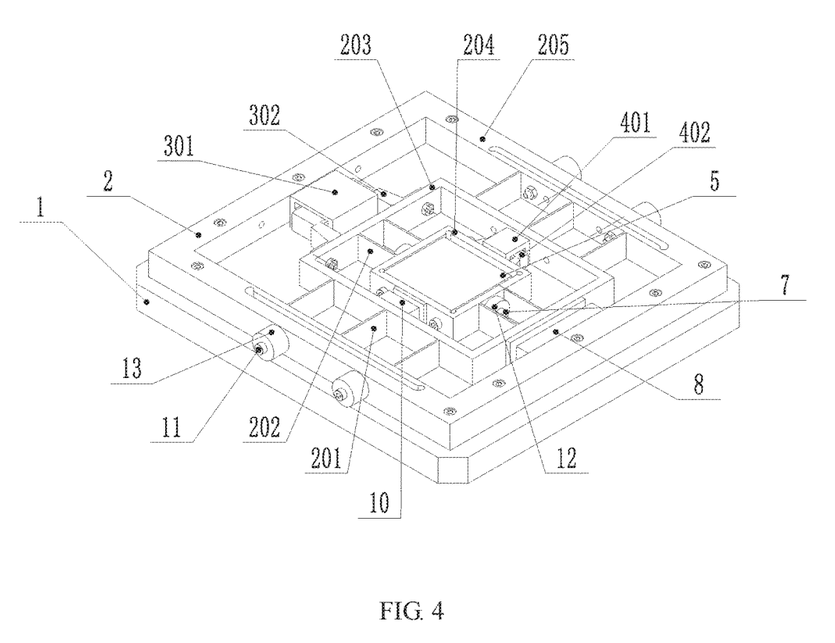
FIG. 4 is a perspective view of another embodiment of the present disclosure.
Figure 5:
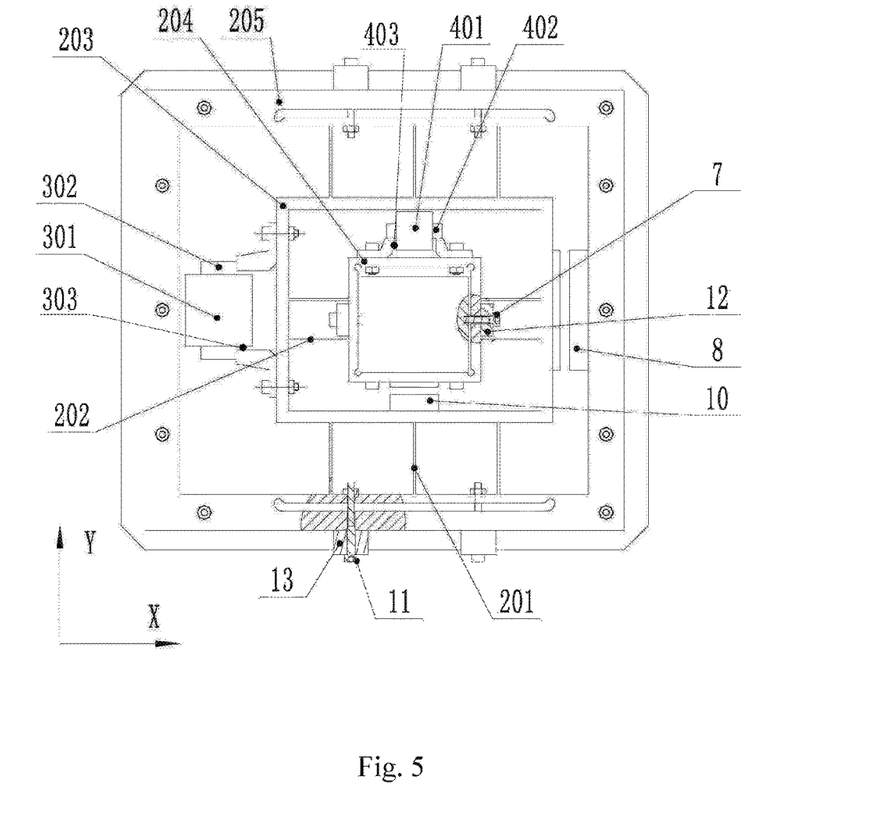
FIG. 5 is a front view of the second embodiment of the present disclosure.

As shown in FIG. 3 through FIG. 5, the X-direction frequency adjusting mechanism 11 includes a bolt and an X-direction piezoelectric ceramic plate 13. The Y-direction frequency adjusting mechanism 7 includes a bolt and a Y-direction piezoelectric ceramic plate 12. The X-direction piezoelectric ceramic plate 13 and the Y-direction piezoelectric ceramic plate 12 when receiving external voltages can make the bolts to perform displacement in their lengthwise directions so as to change the tension levels of the X-direction motion sub-stage spring member 6 and of the Y-direction motion sub-stage spring member 9, respectively, thereby changing the tension levels of membranes in the X-direction membrane set 201 and in the Y-direction membrane set 202, and in turn achieving dynamic adjustment of the inherent frequency of the stage.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A stiffness-frequency adjustable XY micromotion stage based on stress stiffening, comprising: an X-direction membrane set, a Y-direction membrane set, an X-direction motion sub-stage, a Y-direction motion sub-stage, an outer frame, an X-direction drive, a Y-direction drive, an X-direction displacement sensor, a Y-direction displacement sensor, a rack and a working table;

the outer frame being fixed to the rack; the elastic X-direction membrane set being arranged at two sides of the X-direction motion sub-stage, with one end thereof connected to an inner wall of the outer frame and an opposite end thereof connected to the X-direction motion sub-stage; the elastic Y-direction membrane set being arranged at two sides of the Y-direction motion sub-stage, with one end thereof connected to an inner wall of the X-direction motion sub-stage, and an opposite end thereof connected to the Y-direction motion sub-stage; the X-direction membrane set and the Y-direction membrane set being perpendicular to each other, and the working table being rigidly connected to the Y-direction motion sub-stage;

membranes in each of the X-direction membrane set and the Y-direction membrane set being parallelly arranged, and having longitudinal directions perpendicular to feed directions of the X-direction motion sub-stage and of the Y-direction motion sub-stage, respectively, the X-direction drive comprising an X-direction drive stator and an X-direction drive mover, the Y-direction drive comprising a Y-direction drive stator and a Y-direction drive mover, the X-direction drive stator and the Y-direction drive stator being both fixed to the rack; the X-direction drive mover being fixed to the X-direction motion sub-stage, and the Y-direction drive mover being fixed to the Y-direction motion sub-stage;

the outer frame having a groove formed at where it adjoins the X-direction membrane set so that an inner side of the outer frame forms a thin and deformable X-direction motion sub-stage spring member, wherein the outer frame has an X-direction frequency adjusting mechanism for adjusting deformation of the X-direction motion sub-stage spring member, and the Y-direction motion sub-stage having a deformable Y-direction motion sub-stage spring member at where it adjoins the Y-direction membrane set, wherein the Y-direction motion sub-stage has a Y-direction frequency adjusting mechanism for adjusting the Y-direction motion sub-stage spring member, and the Y-direction motion sub-stage having round recesses formed at inner corners thereof.

2. The stiffness-frequency adjustable XY micromotion stage based on stress stiffening of claim 1, wherein an X-direction displacement sensor and Y-direction displacement sensor are provided at ends of the feed directions of the X-direction motion sub-stage and of the Y-direction motion sub-stage, respectively.

3. The stiffness-frequency adjustable XY micromotion stage based on stress stiffening of claim 2, wherein the X-direction displacement sensor and the Y-direction displacement sensor are capacitive or inductive sensors.

4. The stiffness-frequency adjustable XY micromotion stage based on stress stiffening of claim 2, wherein insulating layers are provided at non-working surfaces of the X-direction displacement sensor and of the Y-direction displacement sensor.

5. The stiffness-frequency adjustable XY micromotion stage based on stress stiffening of claim 1, wherein the X-direction membrane set, the Y-direction membrane set, the X-direction motion sub-stage, the Y-direction motion sub-stage and the outer frame are integratedly formed.

6. The stiffness-frequency adjustable XY micromotion stage based on stress stiffening of claim 1, wherein an X-direction voice coil motor has a magnetic stator and a coil mover that are separated by an interval in the Y direction as shown in the drawings, and a Y-direction voice coil motor has a magnetic stator and a coil mover that are separated by an interval in the X direction as shown in the drawings, thereby the driving mechanisms enable XY motion decoupling.

7. The stiffness-frequency adjustable XY micromotion stage based on stress stiffening of claim 1, wherein the X-direction driver and the Y-direction driver are voice coil motors.

8. The stiffness-frequency adjustable XY micromotion stage based on stress stiffening of claim 1, wherein the X-direction frequency adjusting mechanism comprises a first bolt that passes through the groove and has two ends connected to two sides of the groove, respectively, and the Y-direction frequency adjusting mechanism comprises a second bolt that passes through the Y-direction motion sub-stage and is connected to the working table.

9. The stiffness-frequency adjustable XY micromotion stage based on stress stiffening of claim 8, wherein the X-direction frequency adjusting mechanism is a piezoelectric ceramic driver that passes through the groove and has two ends connected to two sides of the groove further comprises an X-direction piezoelectric ceramic plate through which the first bolt passes, and the Y-direction frequency adjusting mechanism is a piezoelectric ceramic driver that passes through the Y-direction motion sub-stage and is connected to the working table further comprises a Y-direction piezoelectric ceramic plate through which the second bolt passes.

10. A stiffness-frequency adjustable XY micromotion stage based on stress stiffening, comprising: an X-direction membrane set, a Y-direction membrane set, an X-direction motion sub-stage, a Y-direction motion sub-stage, an outer frame, an X-direction drive, a Y-direction drive, an X-direction displacement sensor, a Y-direction displacement sensor, a rack and a working table;

the outer frame being fixed to the rack; the elastic X-direction membrane set being arranged at two sides of the X-direction motion sub-stage, with one end thereof connected to an inner wall of the outer frame and an opposite end thereof connected to the X-direction motion sub-stage; the elastic Y-direction membrane set being arranged at two sides of the Y-direction motion sub-stage, with one end thereof connected to an inner wall of the X-direction motion sub-stage, and an opposite end thereof connected to the Y-direction motion sub-stage; the X-direction membrane set and the Y-direction membrane set being perpendicular to each other, and the working table being rigidly connected to the Y-direction motion sub-stage;

membranes in each of the X-direction membrane set and the Y-direction membrane set being parallelly arranged, and having longitudinal directions perpendicular to feed directions of the X-direction motion sub-stage and of the Y-direction motion sub-stage, respectively;

the X-direction drive comprising an X-direction drive stator and an X-direction drive mover, the Y-direction drive comprising a Y-direction drive stator and a Y-direction drive mover, the X-direction drive stator and the Y-direction drive stator being both fixed to the rack; the X-direction drive mover being fixed to the X-direction motion sub-stage, and the Y-direction drive mover being fixed to the Y-direction motion sub-stage; wherein an X-direction voice coil motor has a magnetic stator and a coil mover that are separated by an interval in the Y direction as shown in the drawings, and a Y-direction voice coil motor has a magnetic stator and a coil mover that are separated by an interval in the X direction as shown in the drawings, thereby the driving mechanisms enable XY motion decoupling;

the outer frame having a groove formed at where it adjoins the X-direction membrane set so that an inner side of the outer frame forms a thin and deformable X-direction motion sub-stage spring member, wherein the outer frame has an X-direction frequency adjusting mechanism for adjusting deformation of the X-direction motion sub-stage spring member, and the Y-direction motion sub-stage having a deformable Y-direction motion sub-stage spring member at where it adjoins the Y-direction membrane set, wherein the Y-direction motion sub-stage has a Y-direction frequency adjusting mechanism for adjusting the Y-direction motion sub-stage spring member.

11. A stiffness-frequency adjustable XY micromotion stage based on stress stiffening, comprising: an X-direction membrane set, a Y-direction membrane set, an X-direction motion sub-stage, a Y-direction motion sub-stage, an outer frame, an X-direction drive, a Y-direction drive, an X-direction displacement sensor, a Y-direction displacement sensor, a rack and a working table;

the outer frame being fixed to the rack; the elastic X-direction membrane set being arranged at two sides of the X-direction motion sub-stage, with one end thereof connected to an inner wall of the outer frame and an opposite end thereof connected to the X-direction motion sub-stage; the elastic Y-direction membrane set being arranged at two sides of the Y-direction motion sub-stage, with one end thereof connected to an inner wall of the X-direction motion sub-stage, and an opposite end thereof connected to the Y-direction motion sub-stage; the X-direction membrane set and the Y-direction membrane set being perpendicular to each other, and the working table being rigidly connected to the Y-direction motion sub-stage;

membranes in each of the X-direction membrane set and the Y-direction membrane set being parallelly arranged, and having longitudinal directions perpendicular to feed directions of the X-direction motion sub-stage and of the Y-direction motion sub-stage, respectively, the X-direction drive comprising an X-direction drive stator and an X-direction drive mover, the Y-direction drive comprising a Y-direction drive stator and a Y-direction drive mover, the X-direction drive stator and the Y-direction drive stator being both fixed to the rack; the X-direction drive mover being fixed to the X-direction motion sub-stage, and the Y-direction drive mover being fixed to the Y-direction motion sub-stage;

the outer frame having a groove formed at where it adjoins the X-direction membrane set so that an inner side of the outer frame forms a thin and deformable X-direction motion sub-stage spring member, wherein the outer frame has an X-direction frequency adjusting mechanism for adjusting deformation of the X-direction motion sub-stage spring member, and the Y-direction motion sub-stage having a deformable Y-direction motion sub-stage spring member at where it adjoins the Y-direction membrane set, wherein the Y-direction motion sub-stage has a Y-direction frequency adjusting mechanism for adjusting the Y-direction motion sub-stage spring member, and the X-direction driver and the Y-direction driver being voice coil motors.

* * * * *